United States Patent
Mizuno et al.

(10) Patent No.: US 11,642,845 B2
(45) Date of Patent: May 9, 2023

(54) THREE-DIMENSIONAL PRINTER COMPRISING FIRST AND SECOND PRINT HEADS AND FIRST, SECOND, AND THIRD DIVIDERS

(71) Applicant: Essentium, Inc., Pflugerville, TX (US)

(72) Inventors: Yasushi Mizuno, Houston, TX (US); Alex Stockton, Pflugerville, TX (US)

(73) Assignee: ESSENTIUM IPCO, LLC, Pflugerville, TX (US)

( * ) Notice: Subject to any disclaimer, the term of this patent is extended or adjusted under 35 U.S.C. 154(b) by 107 days.

(21) Appl. No.: 17/241,843

(22) Filed: Apr. 27, 2021

(65) Prior Publication Data
US 2022/0339863 A1 Oct. 27, 2022

(51) Int. Cl.
| | |
|---|---|
| *B29C 64/182* | (2017.01) |
| *B29C 64/118* | (2017.01) |
| *B29C 64/209* | (2017.01) |
| *B29C 64/25* | (2017.01) |
| *B29C 64/236* | (2017.01) |
| *B33Y 40/00* | (2020.01) |
| *B33Y 30/00* | (2015.01) |

(52) U.S. Cl.
CPC .......... *B29C 64/182* (2017.08); *B29C 64/118* (2017.08); *B29C 64/209* (2017.08); *B29C 64/236* (2017.08); *B29C 64/25* (2017.08); *B33Y 30/00* (2014.12); *B33Y 40/00* (2014.12)

(58) Field of Classification Search
CPC .... B29C 64/171; B29C 64/176; B29C 64/182
See application file for complete search history.

(56) References Cited

U.S. PATENT DOCUMENTS

| | | | | |
|---|---|---|---|---|
| 2004/0104515 A1* | 6/2004 | Swanson | ................. | B29C 64/40 264/497 |
| 2005/0280185 A1* | 12/2005 | Russell | ................. | B29C 64/165 425/375 |
| 2010/0021580 A1* | 1/2010 | Swanson | ................ | B33Y 30/00 425/132 |
| 2012/0164256 A1* | 6/2012 | Swanson | ............... | B29C 64/118 425/375 |
| 2013/0078073 A1* | 3/2013 | Comb | .................... | B33Y 40/00 414/800 |
| 2015/0079217 A1* | 3/2015 | Oudsen | ................. | B29C 64/118 425/375 |

(Continued)

*Primary Examiner* — Timothy Kennedy
(74) *Attorney, Agent, or Firm* — Vivacqua Crane, PLLC

(57) ABSTRACT

A three-dimensional printer for manufacturing additive printed parts includes a housing defining a cavity and first and second fixed rails extending along a first axis. First and second movable rails extend along a second axis and move independent of other another along the first axis. First and second print heads move along the second axis on the first and second movable rails, respectively, and first, second, and third dividers collectively separate the cavity to partially define process and instrument chambers. The first divider is mounted to the housing and the first movable rail and expands and contracts with the movement of the first movable rail. The second divider is mounted to the housing and the second movable rail and expands and contracts with the movement of the second movable rail. The third divider is mounted to the movable rails and expands and contracts with the movement of the movable rails.

20 Claims, 10 Drawing Sheets

(56) References Cited

U.S. PATENT DOCUMENTS

| | | | |
|---|---|---|---|
| 2015/0231827 A1* | 8/2015 | Uzan | B29C 64/209 |
| | | | 425/375 |
| 2017/0095979 A1* | 4/2017 | Sasaki | B33Y 30/00 |
| 2017/0121039 A1* | 5/2017 | Ciesiun | B29C 64/182 |
| 2017/0129181 A1* | 5/2017 | Kunioka | B22F 12/00 |
| 2019/0210284 A1* | 7/2019 | Bosveld | B29C 64/25 |
| 2019/0217532 A1* | 7/2019 | Schroeder | B29C 64/118 |
| 2019/0322048 A1* | 10/2019 | Huitema | B33Y 30/00 |
| 2019/0351613 A1* | 11/2019 | Frutuoso | B29C 64/393 |
| 2020/0254689 A1* | 8/2020 | Gjovik | B33Y 10/00 |
| 2022/0314542 A1* | 10/2022 | Neal | B29C 64/364 |

* cited by examiner

THREE-DIMENSIONAL PRINTER COMPRISING FIRST AND SECOND PRINT HEADS AND FIRST, SECOND, AND THIRD DIVIDERS

INTRODUCTION

The present disclosure relates to three-dimensional printers that manufacture additive printed parts and more particularly to a three-dimensional printer comprising first and second print heads and first, second, and third dividers.

Three-dimensional printers are utilized by many industries to quickly produce parts by additive deposition of material. Three-dimensional printers generally include a print head that heats a filament comprising a polymer and deposits the molten filament onto a print bed in progressive layers to form the part.

Some three-dimensional printers utilize two print heads that may be utilized cooperatively to produce a single part or individually to produce two parts. Although useful, the two print heads and the bed support are often open to the outside air. The outside air is significantly cooler than the molten filament and is uncontrolled. As such, the cooling rate of the filament is generally fast and uncontrolled, leading to inconsistencies and imperfections in the structure and appearance of the parts. Furthermore, attempts to control the cooling rate of the molten filament by placing the print bed and the print heads in a heated chamber have led to degradation of the heat-sensitive electronics that control the print heads.

As such, there is a need in the art for three-dimensional printers that address at least the aforementioned problems.

SUMMARY

According to several aspects of the present disclosure, A three-dimensional printer for manufacturing additive printed parts comprises a housing defining a cavity and first and second fixed rails extending parallel to one another along a first axis and mounted to the housing. The three-dimensional printer further comprises first and second movable rails extending parallel to one another along a second axis, orthogonal to the first axis, with the first and second movable rails coupled to both of the first and second fixed rails and arranged to move independent of other another along the first axis on the first and second fixed rails. The three-dimensional printer further comprises a first print head coupled to and movable along the second axis on the first movable rail. The three-dimensional printer further comprises a second print head coupled to and movable along the second axis on the second movable rail, independent of the first print head. The three-dimensional printer further comprises first, second, and third dividers extending between the first and second fixed rails and collectively separating the cavity to partially define a process chamber and an instrument chamber. The first divider is mounted to both the housing and the first movable rail and is arranged to expand and contract with the movement of the first movable rail along the first axis. The second divider is mounted to both of the housing and the second movable rail and is arranged to expand and contract with the movement of the second movable rail along the first axis. The third divider is mounted to both of the first and second movable rails and is arranged to expand and contract with the movement of one or both of the first and second movable rails along the first axis.

In one aspect, each of the first, second, and third dividers comprise a plurality of alternating upper pleats and lower pleats that are configured to open when expanded and close when contracted.

In another aspect, the upper pleats and the lower pleats extend along the second axis to facilitate expansion and contraction of the first, second, and third dividers along the first axis.

In another aspect, each of the first, second, and third dividers have a compression ratio at least 10:1.

In another aspect, each of the first, second, and third dividers comprise a plurality of strips that are sequentially disposed such that each strip partially defines one of the upper pleats and one of the lower pleats.

In another aspect, each of the strips comprise a body extending to opposing upper contact walls and lower contact walls, with the upper contact walls of adjacent strips joined to one another at the upper pleat and with the lower contact walls of adjacent strips joined to one another at the lower pleat.

In another aspect, the adjacent upper contact walls and adjacent lower contact walls are joined together by a mechanical fastener.

In another aspect, the mechanical fastener is further defined as thread, with adjacent strips joined to another by sewing.

In another aspect, the three-dimensional printer further comprises a plurality of support members individually disposed in the lower pleats to retain the first, second, and third dividers in a substantially planar configuration along the first and second axes.

In another aspect, each support member defines a plurality of holes extending therethrough, with adjacent strips joined together through the holes to couple together the strips and the supports.

In another aspect, each of the strips comprise a lower contact wall, with the support members individually disposed between adjacent strips and mounted to the respective lower contact walls.

In another aspect, the support members and the lower contact walls each have a cross-sectional area, with the cross-sectional area of each support member greater than the cross-sectional area of each lower contact wall to resist bending.

In another aspect, each support member has a thickness of 0.1 mm-0.3 mm.

In another aspect, the support members are comprised of spring steel.

In another aspect, the first, second, and third dividers are comprised of an insulative material to reduce thermal transmission between the process and instrument chambers.

In another aspect, the insulative material is further defined as a carbon-aramide fabric having an aluminized coating facing the process chamber.

In another aspect, each of the first and second movable rails comprise a pair of tracks extending parallel one another with the print heads disposed between and movably coupled to the tracks.

In another aspect, each of the first and second movable rails comprise a pair of rail dividers disposed between the pair of tracks on opposing sides of the print head, with the pair of rail dividers arranged to expand and contract with the movement of the print head along the movable rail.

In another aspect, the three-dimensional printer further comprises each of the rail dividers comprise a plurality of alternating upper pleats and lower pleats that are configured to open when expanded and close when contracted, with the upper pleats and the lower pleats of the rail dividers orthogonal to the upper pleats and the lower pleats of the first, second, and third dividers.

In another aspect, a printed circuit board disposed in the instrument chamber and operably coupled to at least one of the first and second print heads.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
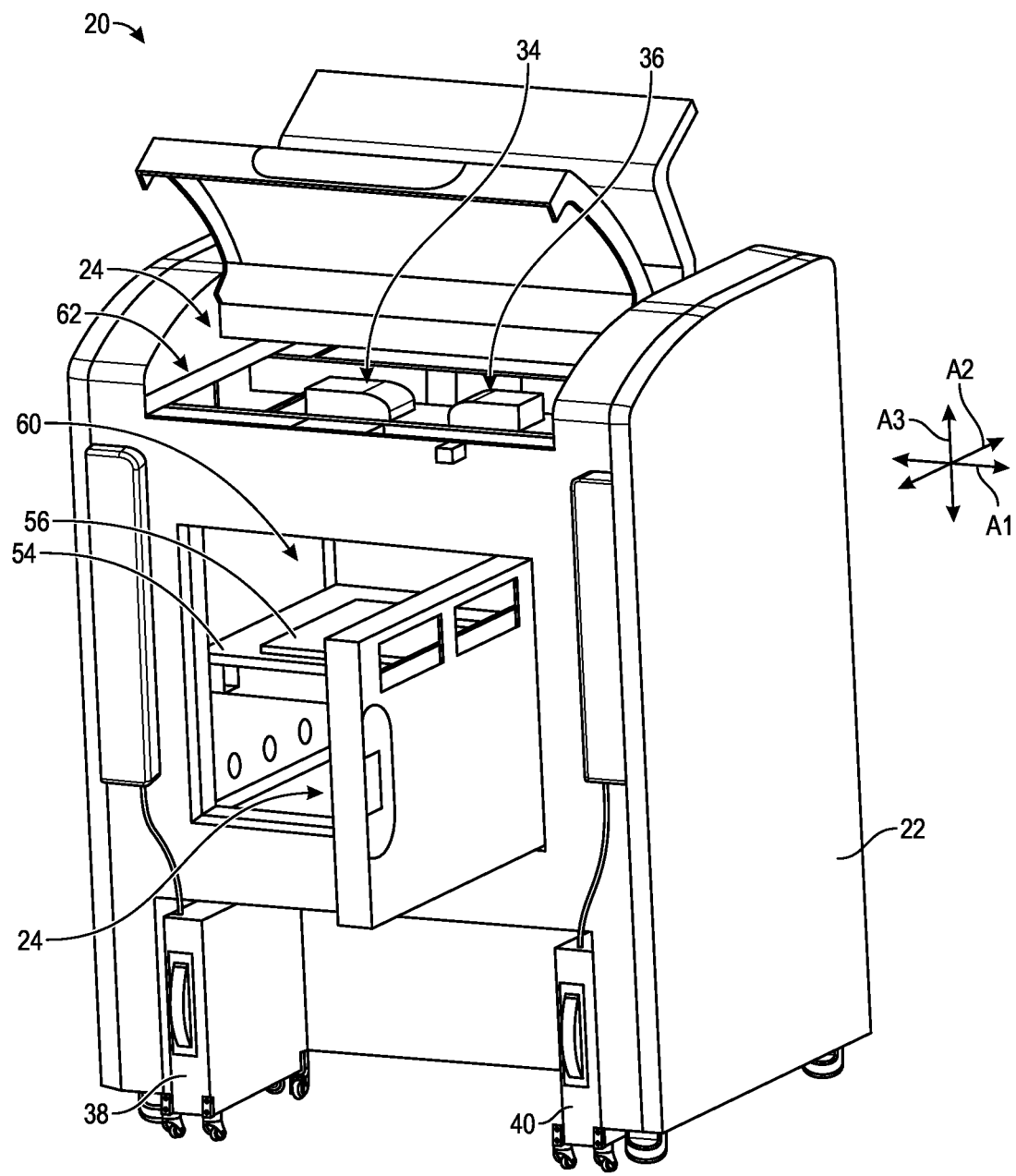
FIG. 1 is a perspective view of a three-dimensional printer.

Referring to FIG. 1, a three-dimensional printer for manufacturing additive printed parts is shown generally at 20. The three-dimensional printer 20 comprises a housing 22 defining a cavity 24, within which components of the three-dimensional printer 20 are supported.

Figure 2:
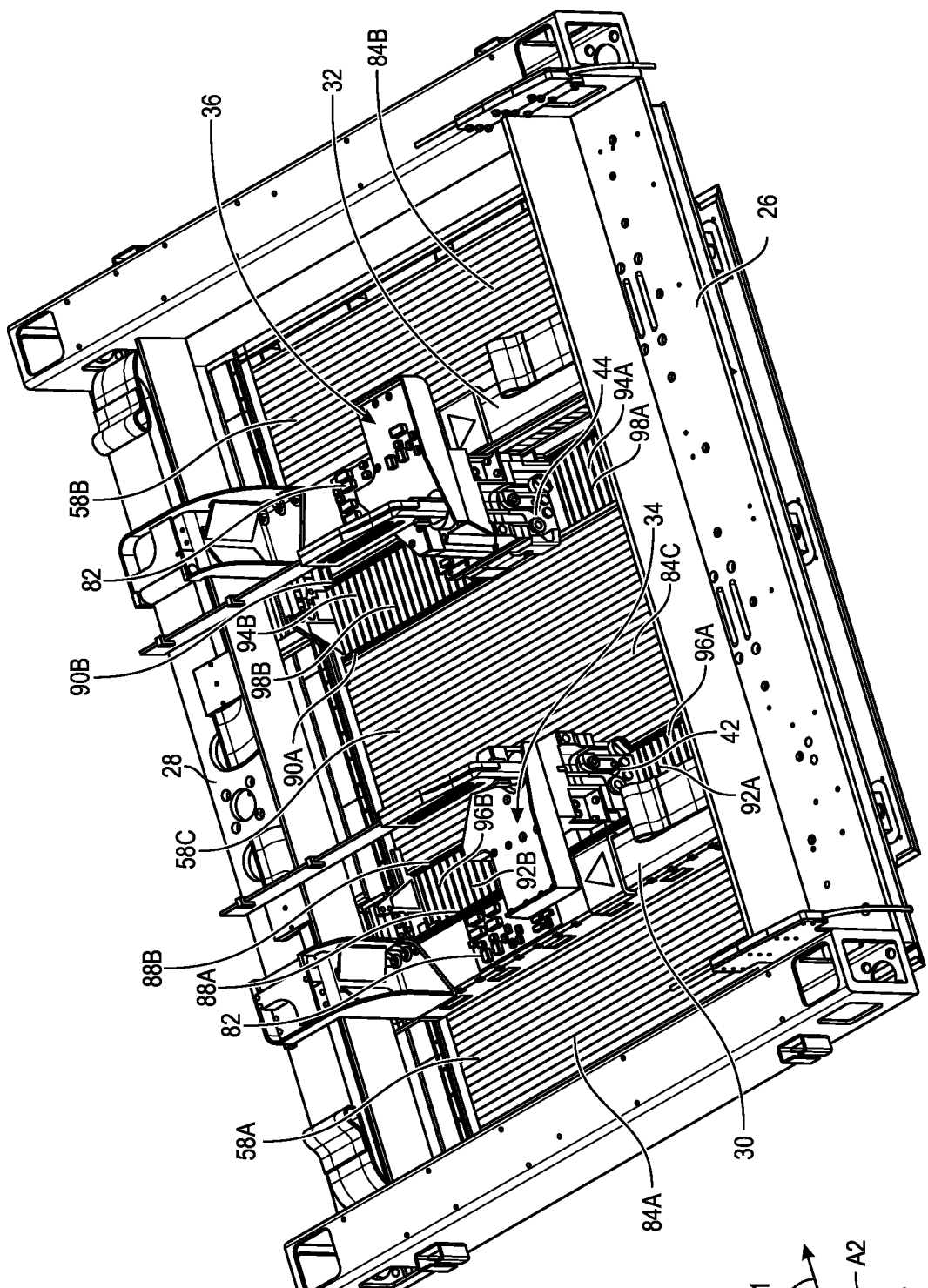
FIG. 2 is a perspective view of a portion of the three-dimensional printer of FIG. 1, showing first and second print heads, first and second fixed rails, first and second movable rails, and first, second, and third dividers of the three-dimensional printer, as seen from above the first fixed rail.
Figure 3:
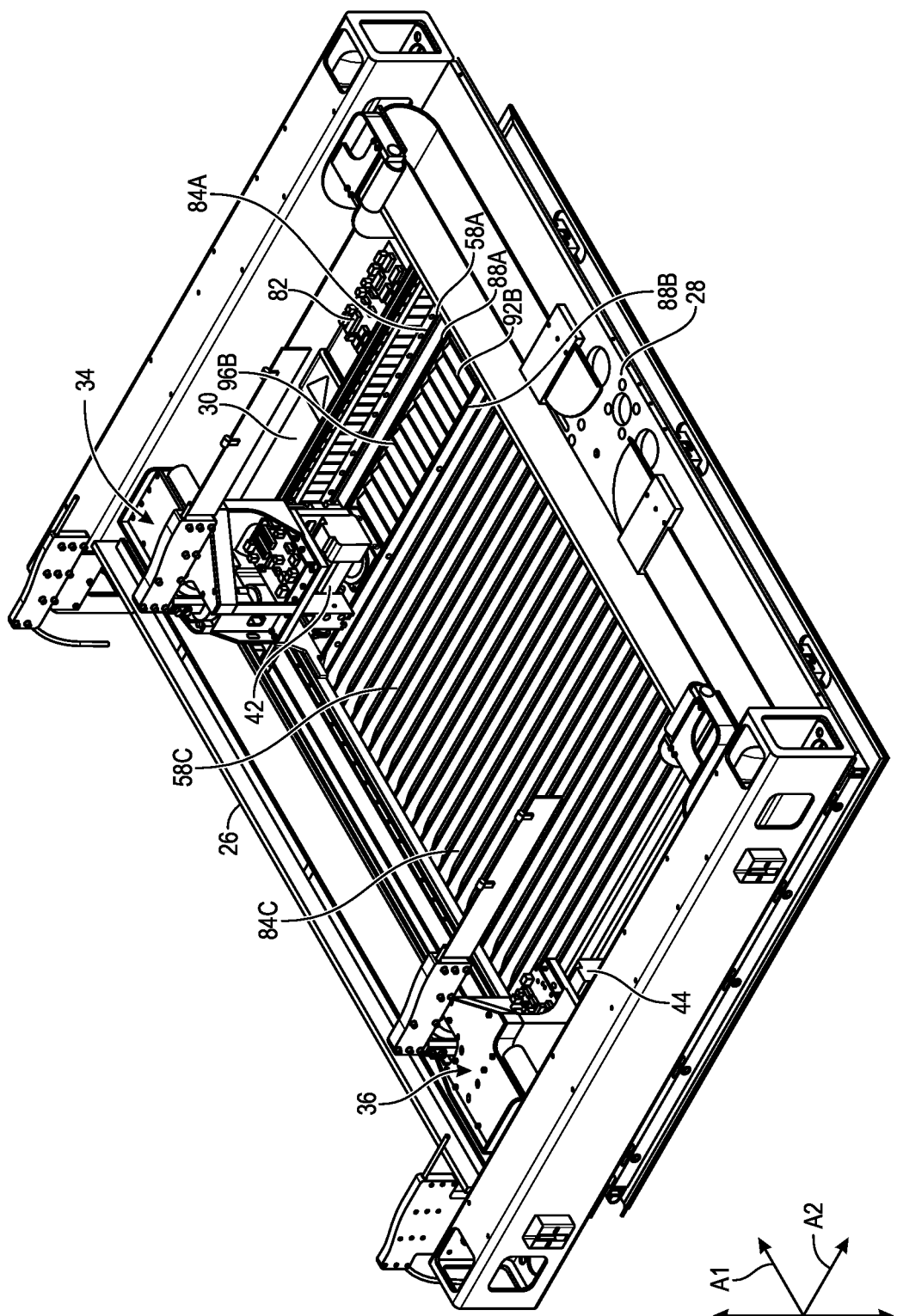
FIG. 3 is a perspective view of the portion of the three-dimensional printer shown in FIG. 2, as seen from above the second fixed rail.

As shown in FIGS. 2 and 3, the three-dimensional printer 20 comprises first and second fixed rails 26, 28 extending parallel to one another along a first axis A1 and mounted to the housing 22. The three-dimensional printer 20 further comprises first and second movable rails 30, 32 extending parallel to one another along a second axis A2, orthogonal to the first axis A1. The first and second movable rails 30, 32 are coupled to both of the first and second fixed rails 26, 28 and are arranged to move independent of other another along the first axis A1 on the first and second fixed rails 26, 28.

The first and second fixed rails 26, 28 may extend along a pair of opposing walls of the housing 22. In the example shown in the Figures, the pair of opposing walls are the front and rear walls of the housing 22. However, the first and second fixed rails 26, 28 may be disposed anywhere within the cavity 24 of the housing 22.

The three-dimensional printer 20 further comprises a first print head 34 coupled to and movable along the second axis A2 on the first movable rail 30 and a second print head 36 coupled to and movable along the second axis A2 on the second movable rail 32, independent of the first print head 34. In the example shown in the Figures, the first axis A1 is associated with what is commonly referred to in the art as the x axis and the second axis A2 is associated with what is commonly referred to in the art as the y axis. The x and y axes (along with a z axis that extends orthogonal to both the x axis and the y axis) establish a three-dimensional coordinate system that is used by the three-dimensional printer 20 to spatially locate the first and second print heads 34, 36, as well as the additive printed parts that will be produced by the first and second print heads 34, 36. Although in this example the first and second axes A1, A2 are associated with the x and y axes, respectively, the opposite may be true (i.e., the first axis A1 may be associated with the y axis and the second axis A2 may be associated with the x axis). Furthermore, the first and second axes A1, A2 may not directly correspond to any of the x, y, and z axes. Said differently, the first and second axes A1, A2 may be angularly and translationally misaligned from the x, y, and z axes.

The three-dimensional printer 20 may further comprise a first filament cartridge 38 having a first filament and a second filament cartridge 40 having a second filament, as shown in FIG. 1. The first filament extends from the first filament cartridge 38 to the first print head 34 and the second filament extends from the second filament cartridge 40 to the second print head 36.

Figure 4:
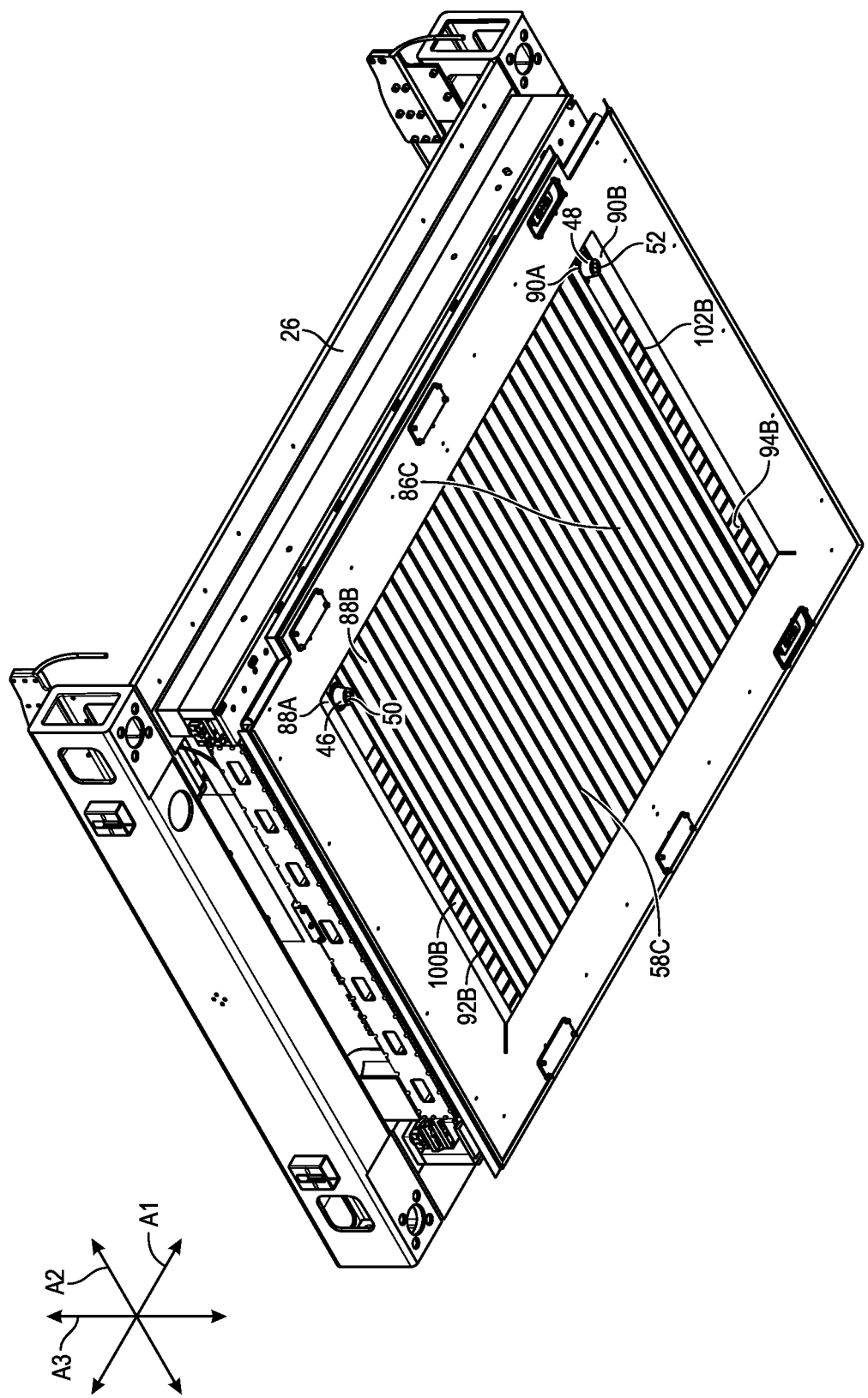
FIG. 4 is a perspective view of the portion of the three-dimensional printer shown in FIG. 2, as seen from below the first fixed rail.
Figure 5:
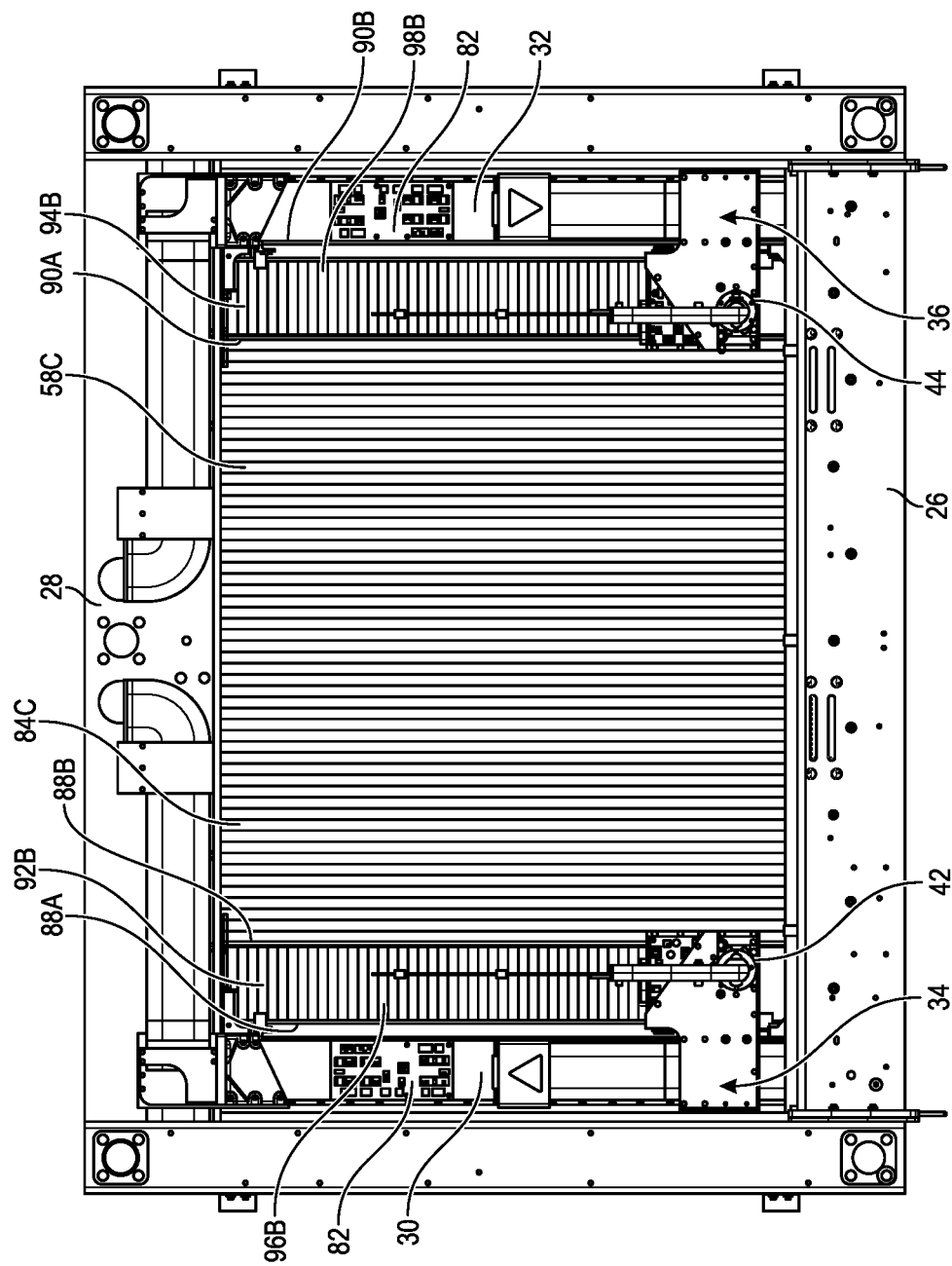
FIG. 5 is an elevational view of the portion of the three-dimensional printer shown in FIG. 2.
Figure 6:
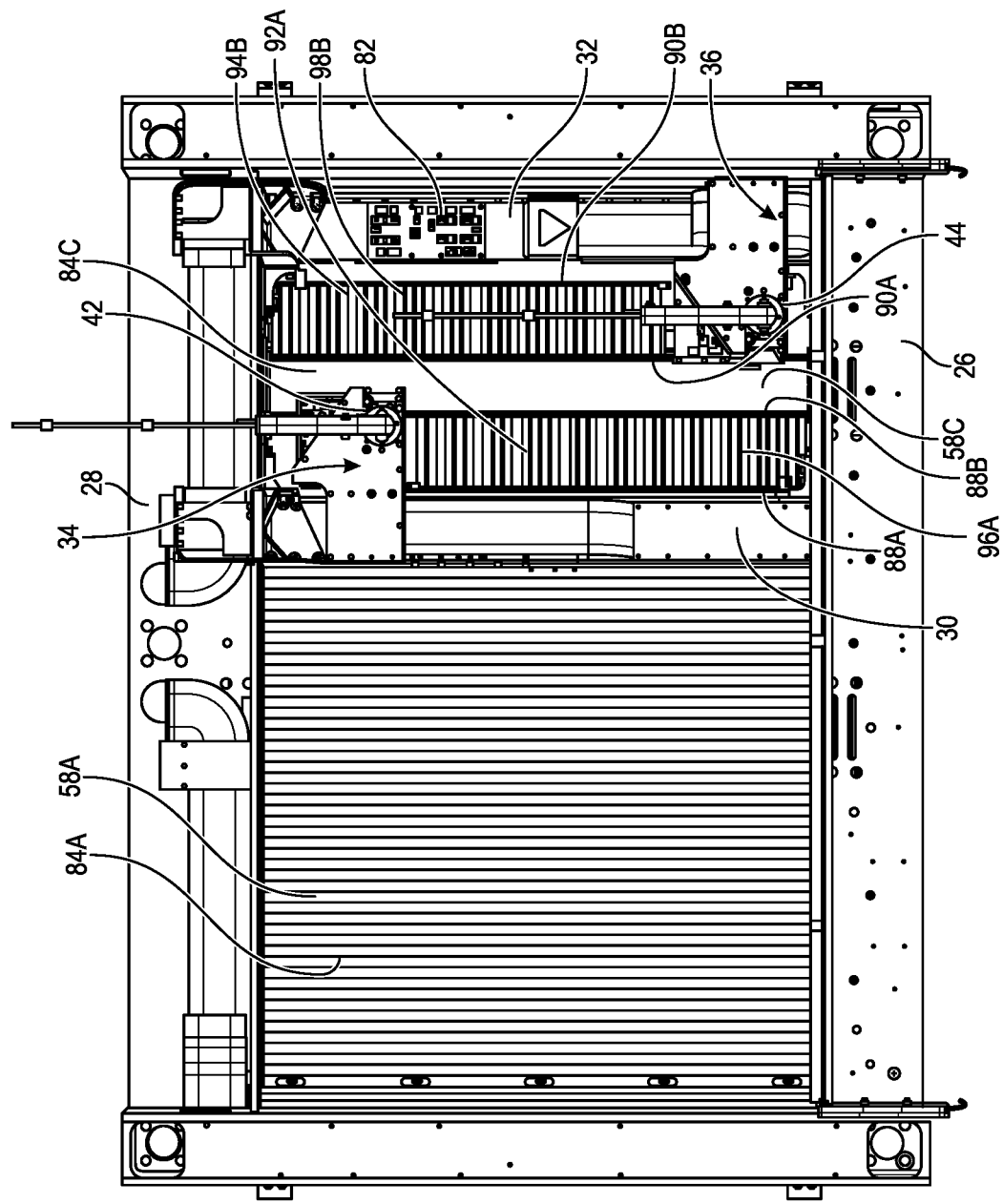
FIG. 6 is an elevational view of the portion of the three-dimensional printer shown in FIG. 2, with the first movable rail and the first print head moved from their positions in FIG. 5.
Figure 6:
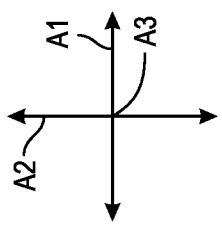

As shown in FIGS. 5 and 6, the first and second print heads 34, 36 are moveable two-dimensionally in a horizontal plane along the first axis A1 and the second axis A2 within the housing 22. Moreover, the first and second print heads 34, 36 are movable independent of one another along the first and second axes A1, A2. Each of the first and second print heads 34, 36 comprise an extruder 42, 44 (as shown in FIGS. 2 and 3) and a nozzle 46, 48 (as shown in FIG. 4). The extruder 42, 44 includes a print head feed motor and is adapted to pull the filament into the print head 34, 36. The extruder 42, 44 then feeds the filament to the nozzle 46, 48. The nozzle 46, 48 includes a heater that melts the filament as it enters the nozzle 46, 48. The nozzle 46, 48 also includes a tip 50, 52 adapted to feed molten filament material out of the nozzle 46, 48 to be deposited when an additive printed part is being created. Continual feeding of the filament into the nozzle 46, 48 by the extruder 42, 44 pushes the molten filament material through the tip 50, 52 of the nozzle 46, 48 to be deposited.

Referring again to FIG. 1, a build table 54 is supported below the print head 34, 36 and is vertically movable up and down along a third axis A3. In this example, the third axis A3 is associated with the z axis, referred to above. However, the third axis A3 may correspond to the x or y axes or may not be associated with any one of the x, y, and z axes.

The build table 54 also includes a print bed 56. The print bed 56 provides a surface onto which one or more additive printed parts are created within the three-dimensional printer 20. When the three-dimensional printer 20 is used to create an additive printed part, the build table 54 starts out positioned high within the three-dimensional printer 20 near the first and second print heads 34, 36. The first and second print heads 34, 36 are configured to move back and forth two dimensionally along the first and second axes A1, A2 and deposit the molten filament material onto the print bed 56, creating a two-dimensional shape on the print bed 56. Once fed from the tip 50, 52 of the nozzle 46, 48 the molten filament material quickly hardens sufficiently to hold shape. The build table 54 gradually moves along the third axis A3 away from the print head 34, 36 as successive layers of molten filament material are deposited on previously deposited layers of now hardened filament material. The first and second print heads 34, 36 continue to add successive layers onto the forming additive printed part until a final three-dimensional shape is formed. In this example, the first and second filaments are polymers; however, any suitable material capable of being melted and deposited to form the additive printed parts may be utilized.

The first and second print heads 34, 36 are capable of moving completely independent of one another along the first and second axes A1, A2. More specifically, the first and second print heads 34, 36 are capable of moving independent of one another along the first axis A1 through the independent movement of the first and second movable rails 30, 32 along the first and second fixed rails 26, 28, as shown between FIGS. 5 and 6. Furthermore, the first and second print heads 34, 36 are capable of moving independent of one another along the second axis A2 through their own independent movement along the first and second movable rails 30, 32, respectively. The independent movement of the first and second print heads 34, 36 facilitate several functions of the three-dimensional printer 20. The first and second print heads 34, 36 may each individually produce an additive printed part. This can be done simultaneously or at different times. Furthermore, the independent movement of the first and second print heads 34, 36 allow each print head 34, 36 to produce an additive printed part that have different designs. In other examples, the first and second print heads 34, 36 may collaboratively form a single additive printed part. For example, the first and second filaments of the first and second print heads 34, 36 may be different (e.g., different compositions, different colors, etc.) The first and second print heads 34, 36 may be synchronized to deposit the molten first and second filaments, respectively, to form one additive printed part.

As shown in FIG. 2, the three-dimensional printer 20 further comprises first, second, and third dividers 58A-C extending between the first and second fixed rails 26, 28 and collectively separating the cavity 24 to partially define a process chamber 60 and an instrument chamber 62, as shown in FIG. 1. In the example shown in Figures, the first, second, and third dividers 58A-C are substantially planar, with the process chamber 60 disposed below the dividers 58A-C and the instrument chamber 62 is disposed above the dividers 58A-C. The build table 54 and the nozzles 46, 48 of the first and second print heads 34, 36 are disposed in the process chamber 60. As such, the process chamber 60 is a region in which the additive printed part(s) are formed. The instrument chamber 62 houses the extruders 42, 44 of the first and second print heads 34, 36, as well as other components that control the operation of the first and second print heads 34, 36. Therefore, the dividers 58A-C serve as a barrier between the chambers that protects the relatively delicate components disposed in the instrument chamber 62. Not only do the dividers 58A-C provide a physical barrier between the chambers, the dividers 58A-C also provide a thermal barrier, which will be described in greater detail below.

Each of the first, second, and third dividers 58A-C extend across the cavity 24 along the second axis A2 and into proximity with the first and second fixed rails 26, 28. The dividers 58A-C may abut or overlap the first and second fixed rails 26, 28. The dividers 58A-C may also be spaced from the first and second fixed rails 26, 28 to allow for movement of the dividers 58A-C relative to the first and second fixed rails 26, 28, while still be substantially covering the space between the first and second fixed rails 26, 28.

As shown in FIG. 2, the first divider is mounted to both the housing 22 and the first movable rail 30 and is arranged to expand and contract with the movement of the first movable rail 30 along the first axis A1. The second divider is mounted to both of the housing 22 and the second movable rail 32 and is arranged to expand and contract with the movement of the second movable rail 32 along the first axis A1. More specifically, the first and second dividers 58A, 58B are mounted to opposing sides of the housing 22 (which in this example are the left and right sides of the housing 22) and extend inwardly along the first axis A1, with the first and second dividers 58A, 58B mounted to the closest proximate movable rail (which is the first movable rail 30 for the first divider and the second movable rail 32 for the second divider). The third divider is mounted to both of the first and second movable rails 30, 32 and is arranged to expand and contract with the movement of one or both of the first and second movable rails 30, 32 along the first axis A1. Accordingly, the first, second, and third dividers 58A-C collectively form a barrier that extends across the along cavity 24 along the first axis A1. More specifically, the first and second dividers 58A, 58B form barriers across the outer regions of the cavity 24 between the movable rails 30, 32 the opposing walls of the housing 22, while the third divider forms a barrier between the first and second movable rails 30, 32. The arrangement of the first, second, and third barrier to expand and contract with the movement of the first and second movable rails 30, 32 ensures that the dividers 58A-C maintain the separation between the process and instrument chambers 60, 62, regardless of the position of the first and second movable rails 30, 32.

Each of the first, second, and third dividers 58A-C are substantially identical. The following description of the first, second, and third dividers 58A-C refers to FIGS. 7-10, which show the first divider 58A in detail. FIGS. 7-10 are exemplary in nature and directly correspond to the second and third dividers 58B and 58C. Therefore, FIGS. 7-10 may be viewed to ascertain details pertaining to the second and third dividers 58B and 58C in the same way the FIGS. 7-10 are viewed to ascertain details pertaining to the first divider 58A.

Figure 7:
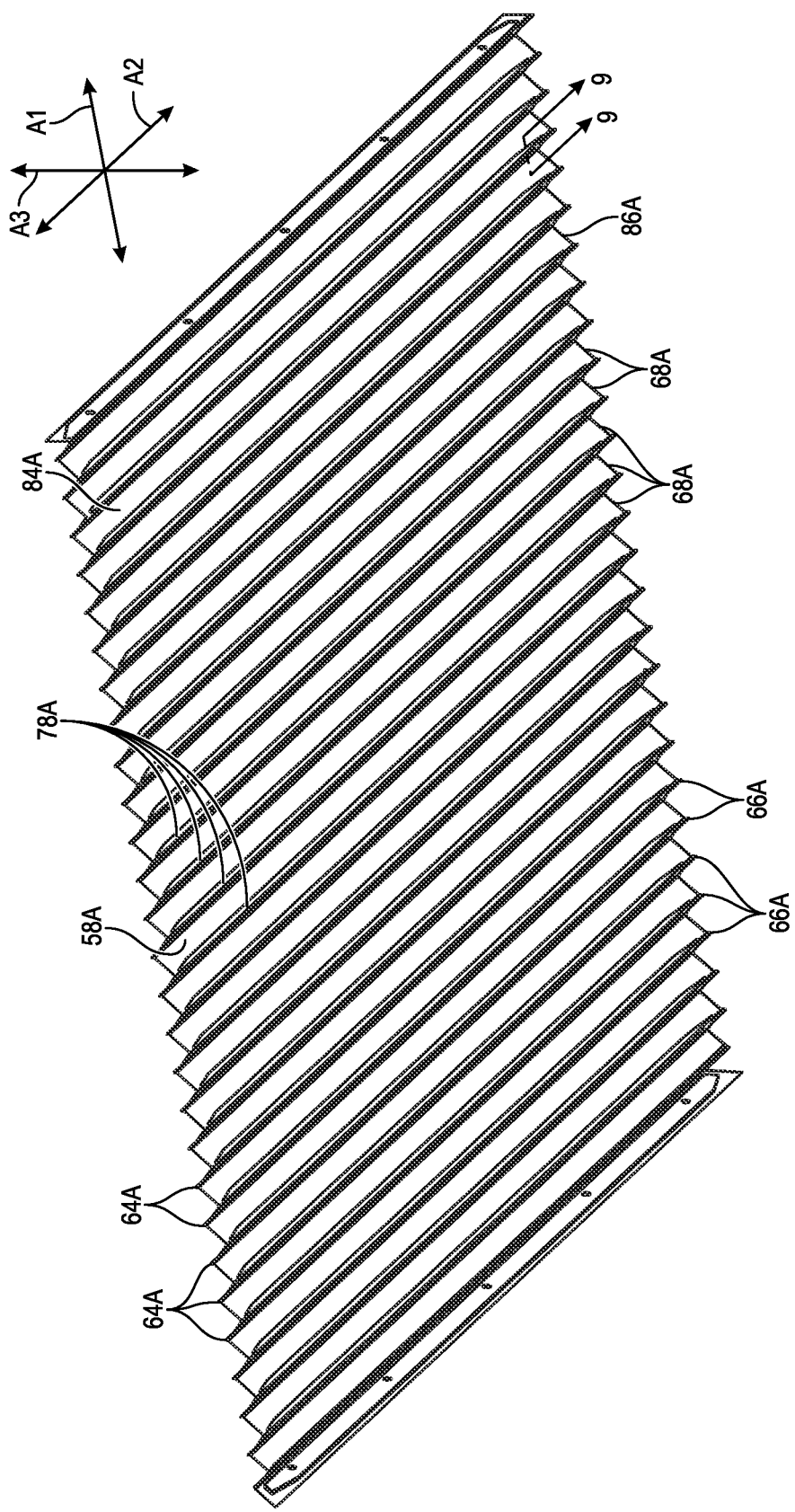
FIG. 7 is a perspective view of the first divider of FIG. 2, shown in an expanded configuration.
Figure 8:
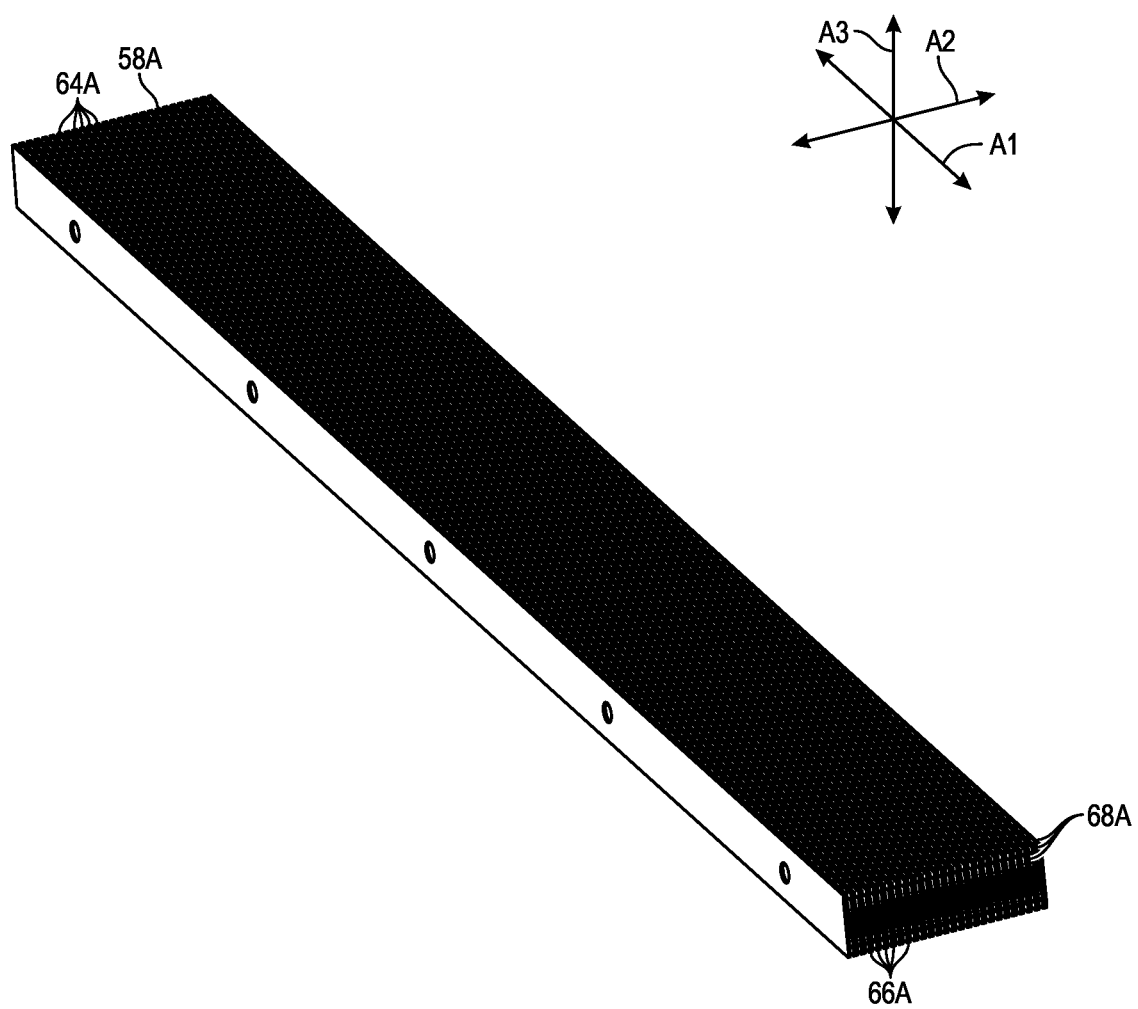
FIG. 8 is a perspective view of the first divider of FIG. 2, shown in a contracted configuration.
Figure 9:
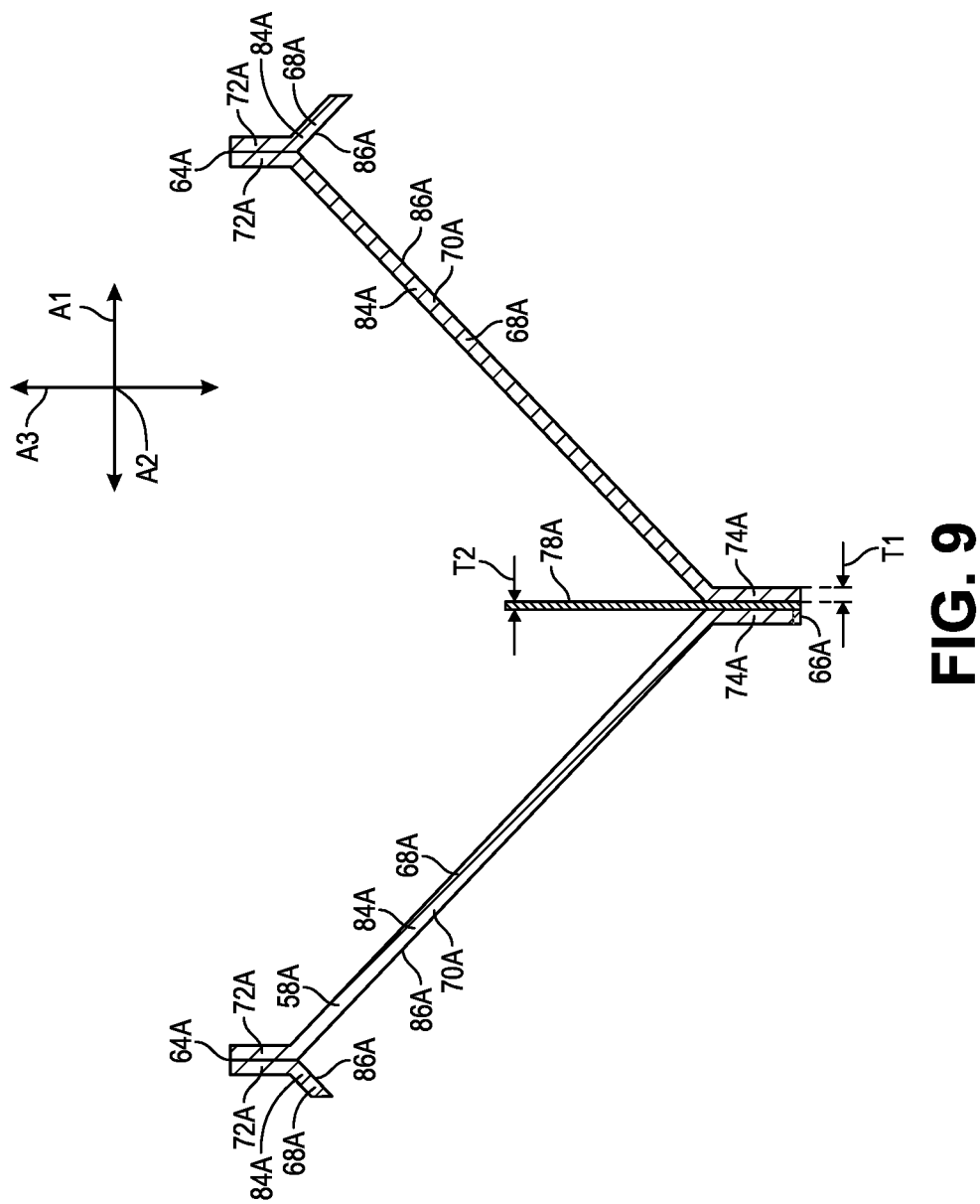
FIG. 9 is a cross-sectional view of a portion of the first divider, taken along line 9-9 in FIG. 7.
Figure 10:
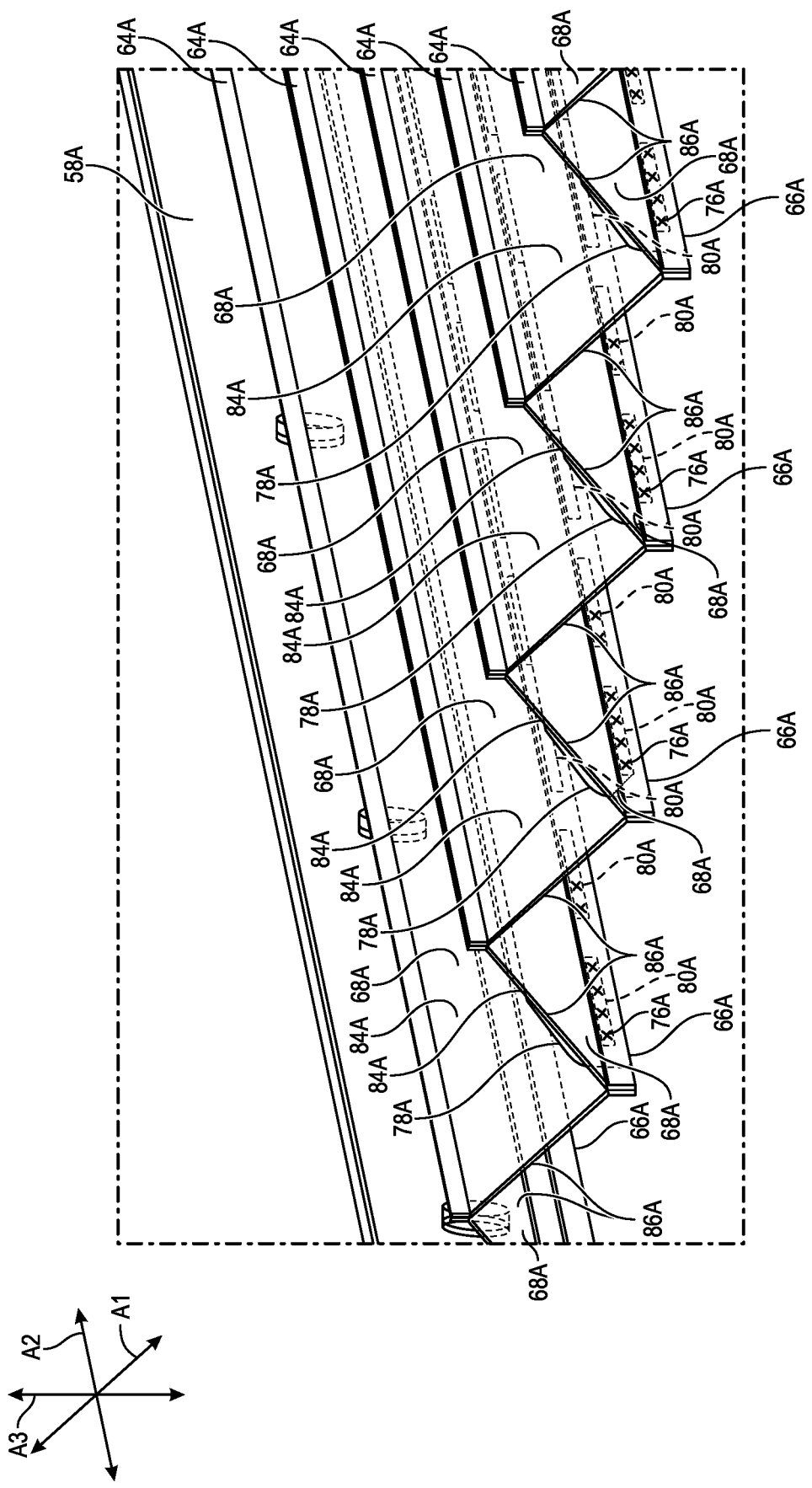
FIG. 10 is a perspective view of a portion of first divider FIG. 2, showing support members of the first divider.

Each of the first, second, and third dividers 58A-C may comprise a plurality of alternating upper pleats 64A-C and lower pleats 66A-C that are configured to open when expanded (as shown in FIG. 7) and close when contracted (as shown in FIG. 8). The upper pleats 64A-C and the lower pleats 66A-C may extend along the second axis A2 to facilitate expansion and contraction of the first, second, and third dividers 58A-C along the first axis A1. More specifically, the alternating upper pleats 64A-C and lower pleats 66A-C form a zig-zag configuration (as shown in FIGS. 9 and 10), with expansion of the dividers 58A-C caused by the widening of the angles of the upper pleats 64A-C and the lower pleats 66A-C and with the contraction of the dividers 58A-C caused by the narrowing of the angles between the upper pleats 64A-C and the lower pleats 66A-C. The dividers 58A-C may be extended until the upper pleats 64A-C and the lower pleats 66A-C have angles of approximately 180 degrees (i.e., extended until the upper pleats 64A-C and the lower pleats 66A-C are completely open and the dividers 58A-C lies flat). The dividers 58A-C may be contracted until the upper pleats 64A-C and the lower pleats 66A-C have angles of approximately zero degrees (i.e., contracted until the upper pleats 64A-C and the lower pleats 66A-C completely closed and folded tight).

Each of the first, second, and third dividers 58A-C may have a compression ratio at least 10:1. The compression ratio refers to the ratio of the maximum length of each divider when fully expanded in comparison to the minimum length of each divider when completely contracted. Therefore, each of the dividers 58A-C are capable of extending at least 10 times longer when fully expanded than when fully contracted. The example shown in the Figures is configured to have a compression ratio of approximately 11:1. The larger the compression ratio, the greater the range of movement of the first and second print heads 34, 36 within the cavity 24, which allows the print heads 34, 36 to move over a larger portion of the print bed 56. As such, as the compression ratio increases, the potential size of the additive printed part(s) increases as well.

As shown in FIGS. 9 and 10, each of the first, second, and third dividers 58A-C may comprise a plurality of strips 68A-C that are sequentially disposed such that each strip 68A-C partially defines one of the upper pleats 64A-C and one of the lower pleats 66A-C. As best shown in FIG. 9, each of the strips 68A-C may comprise a body 70A-C extending to opposing upper contact walls 72A-C and lower contact walls 74A-C, with the upper contact walls 72A-C of adjacent strips 68A-C joined to one another at the upper pleat 64A-C and with the lower contact walls 74A-C of adjacent strips 68A-C joined to one another at the lower pleat 66A-C. The adjacent upper contact walls 72A-C and adjacent lower contact walls 74A-C may be joined together by a mechanical fastener 76A-C, as shown in FIG. 10. The mechanical fastener 76A-C may be further defined as thread, with adjacent strips 68A-C joined to another by sewing. However, the adjacent strips 68A-C may be joined in any other suitable manner, including chemical bonding, welding, etc.

In most examples, joining the plurality of strips 68A-C allow for a greater compression ratio than folding one large piece of the same material to form the upper pleats 64A-C and the lower pleats 66A-C. More specifically, folding material often causes bunching along the inner radius of the folds, which correspondingly enlarges the outer radius. As such, the outer radius is often greater than the thickness of the material, which inhibits the ability of the adjacent folds to lie fully against one another and limits the compression ratio. The plurality of strips 68A-C utilized in this example have a consistent thickness from upper pleat 64A-C to the lower pleat 66A-C, which facilitate the compression ratio described above. Furthermore, in this example the strips 68A-C have a thickness T1 (as shown in FIG. 9) of approximately 0.7 mm-0.8 mm to further facilitate the compression ratio described above.

Although the plurality of strips 68A-C are utilized in the example shown in the Figures, it is to be appreciated that a single, folded, continuous material may be utilized in other examples not shown herein.

As shown in FIGS. 9 and 10, the three-dimensional printer 20 may further comprise a plurality of support members 78A-C individually disposed in the lower pleats 66A-C to retain the first, second, and third dividers 58A-C in a substantially planar configuration along the first and second axes A1, A2. Said differently, the support members 78A-C provide rigidity to the first, second, and third dividers 58A-C, which reduces the amount of sagging that occurs from the dividers 58A-C spanning the cavity 24. The support members 78A-C may be comprised of spring steel, which generally has a high yield strength that both supports the dividers 58A-C and allows the support members 78A-C to return to their original shape despite deflection and twisting due to loads exerted on the support members 78A-C by the weight of the dividers 58A-C. However, the support members 78A-C may be comprised of other materials that are capable of retaining the first, second, and third dividers 58A-C in a substantially planar configuration along the first and second axes A1, A2, including carbon fiber, polymers, ceramics, etc.

Each support member 78A-C may have a thickness T2 of 0.1 mm-0.3 mm. As best illustrated in FIG. 9, each support member 78A-C has a thickness T2 of approximately 0.2 mm. The thickness T2 of the support member 78A-C is smaller than the approximately 0.7 mm-0.8 mm thickness T1 of the strips 68A-C, as described above. As such, the support members 78A-C marginally increase the compression ratio of the dividers 58A-C in comparison to dividers 58A-C with strips 68A-C but without support members 78A-C. The support members 78A-C and the lower contact walls 74A-C may each have a cross-sectional area. The cross-sectional area of each support member 78A-C may be greater than the cross-sectional area of each lower contact wall 74A-C to resist bending. To achieve the larger cross-sectional area, the than the lower contact walls 74A-C, the support members 78A-C extend upwardly beyond contact walls (i.e., a greater distance than the contact walls).

As shown in FIG. 10, each support member 78A-C may define a plurality of holes 80A-C extending therethrough, with adjacent strips 68A-C joined together through the holes 80A-C to couple together the strips 68A-C and the supports. More specifically, the support members 78A-C may be individually disposed between adjacent strips 68A-C and mounted to the respective lower contact walls 74A-C. The plurality of holes 80A-C provides access to the adjacent lower contact walls 74A-C through the support member 78A-C for fastening therethrough by sewing (as described above) or any other suitable manner of joining.

The first, second, and third dividers 58A-C may be comprised of an insulative material to reduce thermal transmission between the process and instrument chambers 60, 62. As described above, the process chamber 60 is the region in which the additive printed part(s) are formed while the instrument chamber 62 houses components that control the operation of the first and second print heads 34, 36. Some of the components in the instrument chamber 62 are relatively delicate in comparison to those in the process chamber 60, and are sensitive to high heat. For example, the three-dimensional printer 20 may further comprise a printed circuit board 82 disposed in the instrument chamber 62 (as shown in FIGS. 2 and 3) and operably coupled to at least one of the first and second print heads 34, 36. Printed circuit boards are sensitive to high heat. More specifically, printed circuit boards are susceptible to loss of structural integrity, disruption of circuit lines, pulling apart of component due to varying rates of material expansion, and oxidation of dielectric materials due to degradation of laminate coatings when subjected to high heat applications. The process chamber 60 may be heated to control the rate of cooling of the molten filament material when deposited in order to improve the quality of the additive printed part (e.g., strength and appearance). In this example, the process chamber 60 is configured to be heated up to approximately 180 degrees C. On the other hand, the desired maximum temperature of the instrument chamber 62 is approximately 50 degrees C.

The insulative material of the first, second, and third dividers 58A-C reduces thermal transmission from the process chamber 60 to the instrument chamber 62. In order to do so, the dividers 58A-C limit convective and radiative heat transfer between the chambers. Convective heat transfer refers to heat transfer that takes place within a fluid. In this example, the fluid is the air within the cavity 24, with convective heating occurring when the air moves from the process chamber 60 to the instrument chamber 62. Radiative heating refers to heat transfer that occurs due to the movement of energized electromagnetic waves. In this example, the insulative material is further defined as a carbon-aramid fabric 84A-C having an aluminized coating 86A-C facing the process chamber 60, as shown in FIG. 9. The carbon-aramid fabric 84A-C extends across the cavity 24 (as described above), which provides a physical barrier to limit fluid flow between the chambers and corresponding convective heating. The aluminized coating 86A-C facing the process chamber 60 (as shown in FIG. 4) can reflect electromagnetic waves that occur within the process chamber 60 back into the process chamber 60, rather than the waves transmitting through the non-reflective carbon-aramid fabric 84A-C. The dividers 58A-C are not limited to the materials described herein and may be constructed of any suitable materials for reducing heat transfer between the process and instrument chambers 60, 62.

As shown in FIGS. 5 and 6, each of the first and second movable rails 30, 32 may comprise a pair of tracks 88A-B, 90A-B extending parallel one another with the print heads 34, 36 disposed between and movably coupled to the tracks 88A-B, 90A-B. The pair of tracks 88A-B, 90A-B widen the support for the print heads 34, 36, which stabilize the print heads 34, 36. The tracks 88A-B, 90A-B also define a space therebetween, through which the nozzle 46, 48 extends into the process chamber 60. However, the space between the tracks 88A-B, 90A-B provides access between the process and instrument chambers 60, 62. In order to separate the chambers, the each of the first and second movable rails 30, 32 may comprise a pair of rail dividers 92A-B, 94A-B disposed between the pair of tracks 88A-B, 90A-B on opposing sides of the print head 34, 36. In each of the of first and second movable rails 30, 32, one of the rail dividers 92A, 94A is coupled to the print head 34, 36 and extends to the first fixed rail 26 while the other one of the rail dividers 92B, 94B is coupled to the print head 34, 36 and extends to the second fixed rails 26, 28. The pair of rail dividers 92A-B, 94A-B are arranged to expand and contract with the movement of the print head 34, 36 along the movable rail. Each of the rail dividers 92A-B, 94A-B may comprise a plurality of alternating upper pleats 96A-B, 98A-B and the lower pleats 100A-B, 102A-B (as shown in FIGS. 2-4) that are configured to open when expanded and close when contracted, with the upper pleats 96A-B, 98A-B and the lower pleats 100A-B, 102A-B of the rail dividers 92A-B, 94A-B orthogonal to the upper pleats 96A-B, 98A-B and the lower pleats 100A-B, 102A-B of the first, second, and third dividers 58A-C. The rail dividers 92A-B, 94A-B may be constructed in the same manner and of the same material as described above for the first, second, and third dividers 58A-C. However, the rail dividers 92A-B, 94A-B are not limited to manner of construction and the materials described herein and may be constructed in any manner and with any suitable materials separating the process and instrument chambers 60, 62.

Accordingly, the dividers 58A-C of the present disclosure offer several advantages. These advantages include serving as a barrier between the process and instrument chambers 60, 62 that protects the relatively delicate components disposed in the instrument chamber 62. Not only do the dividers 58A-C provide a physical barrier between the chambers 60, 62, the dividers 58A-C also provide a thermal barrier. The dividers 58A-C are comprised of an insulative material that reduces thermal transmission between the process and instrument chambers 60, 62, maintaining the temperature in the instrument chamber 62 (where the sensitive electronics of the print heads 34, 36 are present) at or below 50 degrees C., even though the process chamber 60 may reach temperatures of 180 degrees C. Further advantages include the use of the plurality of the strips 68A-C to form the dividers 58A-C, which allows for a larger compression ratio than dividers utilizing a single, folded piece of material. The larger compression ratio increases the range of movement of the first and second print heads 34, 36 within the cavity 24, which allows the print heads 34, 36 to move over a larger portion of the print bed 56, increasing the potential size of the additive printed part(s).

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A three-dimensional printer for manufacturing additive printed parts, comprising:
   a housing defining a cavity;
   first and second fixed rails extending parallel to one another along a first axis and mounted to the housing;
   first and second movable rails extending parallel to one another along a second axis, orthogonal to the first axis, with the first and second movable rails coupled to both of the first and second fixed rails and arranged to move independent of other another along the first axis on the first and second fixed rails;
   a first print head coupled to and movable along the second axis on the first movable rail;
   a second print head coupled to and movable along the second axis on the second movable rail, independent of the first print head; and
   first, second, and third dividers extending between the first and second fixed rails and collectively separating the cavity to partially define a process chamber and an instrument chamber;
   wherein the first divider is mounted to both the housing and the first movable rail and is arranged to expand and contract with the movement of the first movable rail along the first axis;
   wherein the second divider is mounted to both of the housing and the second movable rail and is arranged to expand and contract with the movement of the second movable rail along the first axis; and
   wherein the third divider is mounted to both of the first and second movable rails and is arranged to expand and contract with the movement of one or both of the first and second movable rails along the first axis.

2. The three-dimensional printer as set forth in claim 1, wherein each of the first, second, and third dividers comprise a plurality of alternating upper pleats and lower pleats that are configured to open when expanded and close when contracted.

3. The three-dimensional printer as set forth in claim 2, wherein the upper pleats and the lower pleats extend along the second axis to facilitate expansion and contraction of the first, second, and third dividers along the first axis.

4. The three-dimensional printer as set forth in claim 2, wherein each of the first, second, and third dividers have a compression ratio at least 10:1.

5. The three-dimensional printer as set forth in claim 2, wherein each of the first, second, and third dividers comprise a plurality of strips that are sequentially disposed such that each strip partially defines one of the upper pleats and one of the lower pleats.

6. The three-dimensional printer as set forth in claim 5, wherein each of the strips comprise a body extending to opposing upper contact walls and lower contact walls, with the upper contact walls of adjacent strips joined to one another at the upper pleat and with the lower contact walls of adjacent strips joined to one another at the lower pleat.

7. The three-dimensional printer as set forth in claim 6, wherein the adjacent upper contact walls and adjacent lower contact walls are joined together by a mechanical fastener.

8. The three-dimensional printer as set forth in claim 7, wherein mechanical fastener is further defined as thread, with adjacent strips joined to another by sewing.

9. The three-dimensional printer as set forth in claim 5, further comprising a plurality of support members individually disposed in the lower pleats to retain the first, second, and third dividers in a substantially planar configuration along the first and second axes.

10. The three-dimensional printer as set forth in claim 9, wherein each support member defines a plurality of holes extending therethrough, with adjacent strips joined together through the holes to couple together the strips and the supports.

11. The three-dimensional printer as set forth in claim 9, wherein each of the strips comprise a lower contact wall, with the support members individually disposed between adjacent strips and mounted to the respective lower contact walls.

12. The three-dimensional printer as set forth in claim 11, wherein the support members and the lower contact walls each have a cross-sectional area, with the cross-sectional area of each support member greater than the cross-sectional area of each lower contact wall to resist bending.

13. The three-dimensional printer as set forth in claim 9, wherein each support member has a thickness of 0.1 mm-0.3 mm.

14. The three-dimensional printer as set forth in claim 9, wherein the support members are comprised of spring steel.

15. The three-dimensional printer as set forth in claim 1, wherein the first, second, and third dividers are comprised of an insulative material to reduce thermal transmission between the process and instrument chambers.

16. The three-dimensional printer as set forth in claim 15, wherein the insulative material is further defined as a carbon aramid fabric having an aluminized coating facing the process chamber.

17. The three-dimensional printer as set forth in claim 1, wherein each of the first and second movable rails comprise a pair of tracks extending parallel one another with the print heads disposed between and movably coupled to the tracks.

18. The three-dimensional printer as set forth in claim 17, wherein each of the first and second movable rails comprise a pair of rail dividers disposed between the pair of tracks on opposing sides of the print head, with the pair of rail dividers arranged to expand and contract with the movement of the print head along the movable rail.

19. The three-dimensional printer as set forth in claim 18, wherein each of the rail dividers comprise a plurality of alternating upper pleats and lower pleats that are configured to open when expanded and close when contracted, with the upper pleats and the lower pleats of the rail dividers orthogonal to the upper pleats and the lower pleats of the first, second, and third dividers.

20. The three-dimensional printer as set forth in claim 1, further comprising a printed circuit board disposed in the instrument chamber and operably coupled to at least one of the first and second print heads.

* * * * *